US005966089A

United States Patent [19]

Greenlees

[11] Patent Number: 5,966,089

[45] Date of Patent: Oct. 12, 1999

[54] WRAPPING OF SOFT CHAFF MUFFIN FOR SUPERSONIC DEPLOYMENT

[75] Inventor: William D. Greenlees, Accokeek, Md.

[73] Assignee: The United States of America as represented by the Secretary of the Navy, Washington, D.C.

[21] Appl. No.: 05/263,721

[22] Filed: Jun. 16, 1972

[51] Int. Cl.[6] .................... G01S 7/38

[52] U.S. Cl. .................... 342/12; 342/13; 102/505

[58] Field of Search .................... 343/18 B, 18 E; 342/13, 14, 12; 102/505

[56] References Cited

U.S. PATENT DOCUMENTS 4,149,166 4/1979 Null .................... 342/13

*Primary Examiner*—John B. Sotomayor
*Attorney, Agent, or Firm*—Thomas E. McDonnell; Charles J. Stockstill

[57] ABSTRACT

A means for preventing the opening of a chaff muffin upon its entry into the air stream of its supersonic-velocity carrier rocket, said means comprising a longitudinal wrapping in addition to the usual circumferential wrapping.

9 Claims, 1 Drawing Sheet

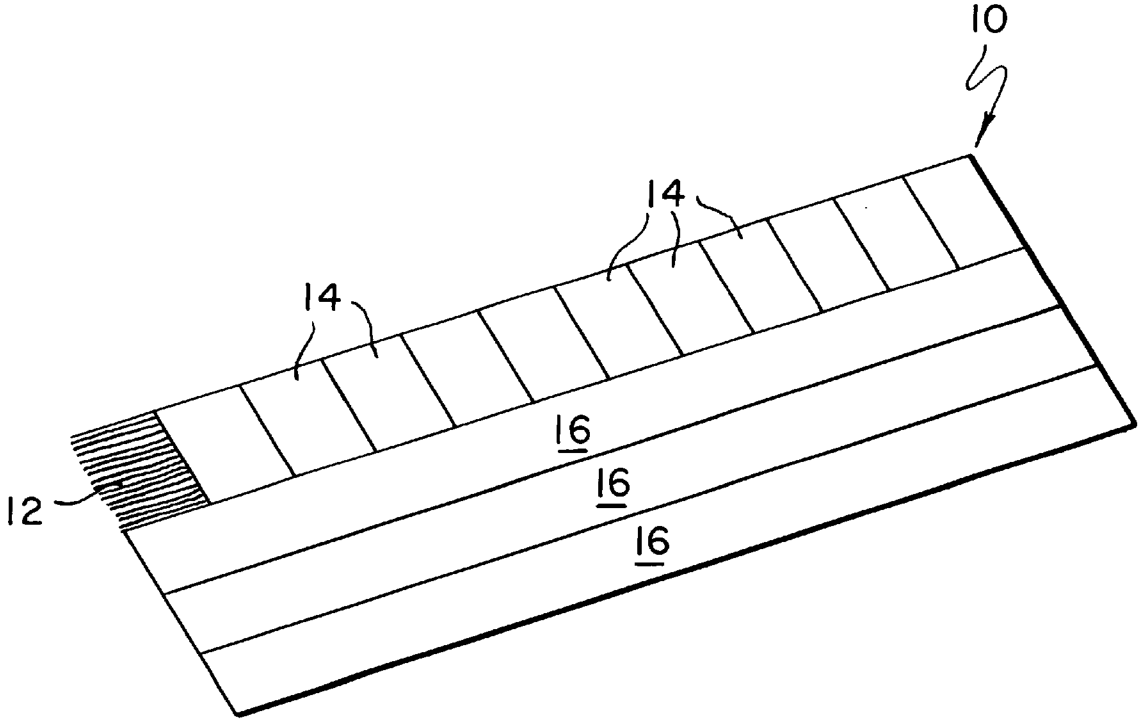
10
14
14
12
16
16
16

WRAPPING OF SOFT CHAFF MUFFIN FOR SUPERSONIC DEPLOYMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radar chaff packages and especially to the proper dispersal of chaff packages from a carrier vehicle traveling at supersonic speeds.

One method of dispersing radar chaff is from carrier rockets which travel at supersonic velocities. Cylindrical packages, or "muffins", each of which consist of a roughly cylindrical bundle of chaff fibers, are wrapped circumferentially with paper for handling purposes. The muffins are then placed in a cylindrical container and several containers are packed together to form a chaff warhead.

The rocket propels the warhead to supersonic velocity and, on fuze actuation, the warhead opens like a clam shell to deploy the individual muffins into the supersonic shock wave. However, the chaff become tangled or birdnested and are slow to blossom into a large radar-reflecting cloud.

To overcome this problem, another wearhead was developed. The chaff is placed in small, wedge-shaped, plastic containers. A number of the wedges are then placed in a phenolic fiberglass cylindrical shell with prima cord running along the center line. On fuze actuation, the prima cord blows the wedges through the shell. At the same time, the prima cord actuates a one-second pyrotechnic delay cartridge in each wedge, allowing the wedges to slow to subsonic-velocity before the delay cartridges actuate a small powder charge which disperses the chaff from the wedges. This technique vastly improved the bloom rate.

Recently, orders of improvement in the chaff bloom rate have been obtained from subsonic mortor-propelled chaff heads using small chaff muffins wrapped circumferentially with multiple windings of mylar plastic film. These mylar windings hold the chaff in place for handling and subsonic deployment. Additionally, the time required for unwrapping allows the muffins to deploy or distribute themselves in space before dispersing the chaff fibers. This gives many well-distributed bloom centers and results in a large, rapidly blooming cloud. No explosive charge need be used for chaff dispersal from the muffins.

While the circumferentially wrapped chaff muffins deploy well at subsonic speeds, they disintegrate immediately when subjected to supersonic air streams. This causes the chaff to clump at one spot in space and give a small, slow-blooming chaff cloud which is an undesirable condition.

BRIEF SUMMARY OF INVENTION

The objects of the invention are accomplished by wrapping the chaff muffin longitudinally in addition to the circumferential wrapping.

An object of the invention is to prevent immediate disintegration of radar chaff muffins upon their entry into a supersonic air stream.

Other objects, advantages and novel features of the invention will become apparent from the following detailed description of the invention when considered in conjunction with the accompanying drawings wherein:

BRIEF DESCRIPTION OF THE DRAWING

The single FIGURE shows one embodiment of the invention in plan view.

DETAILED DESCRIPTION

An embodiment of the invention is shown in the drawing. The radar chaff muffin 10 is substantially cylindrical in shape, the individual chaff fibers 12 extending longitudinally along the axis of the cylinder.

The chaff fibers 12 are wrapped circumferentially with circumferential windings 14 and then overwrapped with longitudinal windings 16. The wrapping material is, preferably, mylar film tape.

The film should preferably be one continuous strip and the longitudinal wrapping should preferably be made after the circumferential wrapping.

Only three longitudinal wraps are shown although the number used in practice would depend on the velocity of the air stream. The circumferential wrapping is shown as not completely covering the chaff fibers so that the fibers may be seen in the drawing; in practice, the fibers are usually completely wrapped circumferentially.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A radar chaff muffin for use at supersonic velocities comprising:

a bundle of radar chaff fibers, said bundle being roughly cylindrical in shape; and a strip of taping material, said strip being wound around said bundle of fibers both circumferentially and longitudinally.

2. A chaff muffin as in claim 1, said taping material being a plastic film.

3. A chaff muffin as in claim 1, wherein the circumferential winding is formed under the longitudinal winding.

4. A chaff muffin as in claim 1, wherein the longitudinal winding is formed under the circumferential winding.

5. A method of preventing the immediate disintegration of a radar chaff muffin upon entry into a supersonic air stream, said muffin being of the type having a cylindrically shaped bundle of chaff fibers held together by a circumferential winding of tape, comprising the step of wrapping said muffin in at least one longitudinal winding of said same tape.

6. In a radar chaff muffin of the type comprising a roughly cylindrical bundle of chaff fibers having a circumferential wrapping for holding the bundle together, a second wrapping extending in the longitudinal direction of said bundle, said muffin thereby becoming efficiently deployable at supersonic velocities.

7. A chaff muffin as in claim 6, wherein said longitudinal wrapping is fabricated from a plastic film.

8. A chaff muffin as in claim 6, wherein said longitudinal wrapping lies above said circumferential wrapping.

9. A chaff muffin as in claim 6, wherein said longitudinal wrapping lies below said circumferential wrapping.

* * * * *